US012744870B2

(12) United States Patent
Rislov et al.

(10) Patent No.: US 12,744,870 B2
(45) Date of Patent: Sep. 22, 2026

(54) COLOR ANGLE SCANNING IN CROP ROW DETECTION

(71) Applicant: Raven Industries, Inc., Sioux Falls, SD (US)

(72) Inventors: David Alan Rislov, Sioux Falls, SD (US); Robert John Vaselaar, Mankato, MN (US)

(73) Assignee: Raven Industries, Inc., Sioux Falls, SD (US)

(*) Notice: Subject to any disclaimer, the term of this patent is extended or adjusted under 35 U.S.C. 154(b) by 304 days.

(21) Appl. No.: 18/400,643

(22) Filed: Dec. 29, 2023

(65) Prior Publication Data

US 2024/0223736 A1 Jul. 4, 2024

Related U.S. Application Data

(60) Provisional application No. 63/436,204, filed on Dec. 30, 2022.

(51) Int. Cl.
*G06T 7/90* (2017.01)
*G06T 3/40* (2006.01)
(Continued)

(52) U.S. Cl.
CPC ................. *H04N 9/64* (2013.01); *G06T 3/40* (2013.01); *G06T 5/10* (2013.01); *G06T 7/90* (2017.01);
(Continued)

(58) Field of Classification Search
CPC .... G06V 20/188; G06V 10/56; G06V 10/443; H04N 9/64; H04N 1/40012; G06T 3/40;
(Continued)

(56) References Cited

U.S. PATENT DOCUMENTS

| | | | | |
|---|---|---|---|---|
| 7,221,482 B2* | 5/2007 | Yamazaki | ............ | H04N 1/6058 358/518 |
| 2003/0152285 A1* | 8/2003 | Feldmann | ............... | G06T 7/194 382/173 |

(Continued)

FOREIGN PATENT DOCUMENTS

| | | |
|---|---|---|
| EP | 0635971 | 1/1995 |
| EP | 1187456 | 3/2002 |

OTHER PUBLICATIONS

"International Application Serial No. PCT US2023 086474, International Search Report mailed May 6, 2024", 4 pgs.

(Continued)

*Primary Examiner* — Shefali D Goradia
(74) *Attorney, Agent, or Firm* — Schwegman Lundberg & Woessner, P.A.

(57) ABSTRACT

System and techniques for adaptive color transformation to aid computer vision are described herein. Colors from an image are mapped into a multi-dimensional space to create a distribution of colors in the image. A dimension of the multi-dimensional space can correspond to a color characteristic. An array of condensed representations of the distribution of colors can be generated. Each condensed representation of the array can be generated by rotating the distribution of colors by a respective color angle about an axis perpendicular to the multi-dimensional space. Algorithms can determine which condensed representation is of a highest quality within the array. Here the highest quality can be determined based on signal energy calculated for each condensed representation. The colors in the image can be transformed into a reduced image using the color angle corresponding to the selected condensed representation. The reduced image can be transmitted to receiver circuitry of an agricultural vehicle.

40 Claims, 13 Drawing Sheets

(51) Int. Cl.
*G06T 5/10* (2006.01)
*H04N 9/64* (2023.01)
*G06V 20/10* (2022.01)

(52) U.S. Cl.
CPC ............... *G06T 2207/10024* (2013.01); *G06T 2207/20056* (2013.01); *G06T 2207/20092* (2013.01); *G06T 2207/30168* (2013.01); *G06T 2207/30188* (2013.01); *G06V 20/188* (2022.01)

(58) Field of Classification Search
CPC ... G06T 5/10; G06T 7/90; G06T 2207/10024; G06T 2207/20056; G06T 2207/20092; G06T 2207/30168; G06T 2207/30188
See application file for complete search history.

(56) References Cited

U.S. PATENT DOCUMENTS

| | | | | |
|---|---|---|---|---|
| 2007/0005208 | A1* | 1/2007 | Han | A01B 69/001<br>701/50 |
| 2016/0012646 | A1* | 1/2016 | Huang | G06T 19/20<br>345/419 |
| 2020/0021716 | A1* | 1/2020 | Sneyders | H04N 1/6008 |

OTHER PUBLICATIONS

"International Application Serial No. PCT US2023 086474, Written Opinion mailed May 6, 2024", 5 pgs.
"Canadian Application Serial No. 3,277,955, Voluntary Amendment filed Jun. 25, 2025", 7 pgs.
"International Application Serial No. PCT/US2023/086474, International Preliminary Report on Patentability mailed Nov. 21, 2024", 7 pgs.

* cited by examiner

COLOR ANGLE SCANNING IN CROP ROW DETECTION

PRIORITY PARAGRAPH

This application claims priority to U.S. Provisional Patent Application 63/436,204 filed Dec. 30, 2022, and titled "COLOR ANGLE SCANNING IN COP ROW DETECTION."

TECHNICAL FIELD

Embodiments described herein generally relate to computer vision systems for vehicles and more specifically to adaptive color transformation for detecting crops or other plants.

BACKGROUND

Many crops that are farmed are row crops. Row crops are arranged into rows that are generally equally spaced parallel rows of planted crops in a field separated by furrows. Tending row crops generally involves passing agricultural equipment (AEQ) (e.g., tractors, planters, harvesters, irrigators, fertilizers, sprayers, cultivators, or the like) over the field. The operator navigates the AEQ through the rows to prevent overrunning of crops by ground engaging elements, such as treads, tracks, runners, or the like. Further, following the middle, centerline, or proximate portions of the crop row with vehicles or implements is desired to conduct husbandry to crops, such as spraying, cultivating or the like.

Navigation systems using an external location mechanism have been employed to facilitate automatic navigation of AEQ. These systems include using global position system (GPS) units to locate the position of AEQ with respect to crop rows. Generally, these systems use an initialization operation to determine positions through which the AEQ should pass and then provide information about the current position of AEQ in a field to facilitate navigation. An example initialization operation includes using a GPS unit to record the movement of AEQ as the row crops are planted. This recording is later used to guide the AEQ for subsequent operations.

Computer vision (CV) is used to guide AEQ down the crop rows. A CV navigation system generally involves a sensor, such as a camera, mounted on the AEQ to collect features of the environment. In some examples, these features are used to ascertain AEQ position relative to a crop related row (e.g., a crop row or a furrow) position and provide that information as parameters to a steering controller to control the AEQ.

OVERVIEW

The present inventors have recognized, among other things, that computer vision can be superior to external location mechanisms when, for example, the external location mechanism is compromised (e.g., has inaccurate or absent positioning) or has not been initialized. Furthermore, the inventors recognize that computer vision can be more complex or difficult in agricultural situations where crops and soil may be close in color for example when the crops are not green (e.g., right after planting or after harvest).

The present subject matter provides a solution to these problems by providing adaptive color transformation that optimizes conversion from color data received from one or more color sensors to single-channel image data. The resulting single-channel image is suitable for crop row detection for various colors, various environmental conditions (e.g., ground color, primary crop color, secondary crop color, presence of weeds or other unwanted plants, illumination, etc.) or the like. The single-channel image permits rapid identification of crop rows, furrows, or the like, and accordingly facilitates cooperative use on a moving AEQ that includes ongoing monitoring of the field.

A system for adaptive color transformation includes a sensor interface configured to couple with one or more color image sensors. The system further includes controller circuitry in communication with the sensor interface to receive a color image. In various examples, the controller circuitry includes mapping circuitry to map colors of the color image into a multi-dimensional space to generate a distribution of colors in the color image. A dimension of the multi-dimensional space corresponds to a color characteristic.

The controller circuitry further includes, in various example, an array generator to generate an array of condensed representations of the distribution of colors. This condensed representation is generated by rotating the distribution of colors by a color angle. The controller circuitry includes a comparator to select a high energy condensed representation of the array having an energy value greater than energy values of other condensed representations in the array. The controller circuitry further includes transformation circuitry to generate a reduced image of an agricultural field by transforming colors in the color image based on the color angle and the high energy condensed representation.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
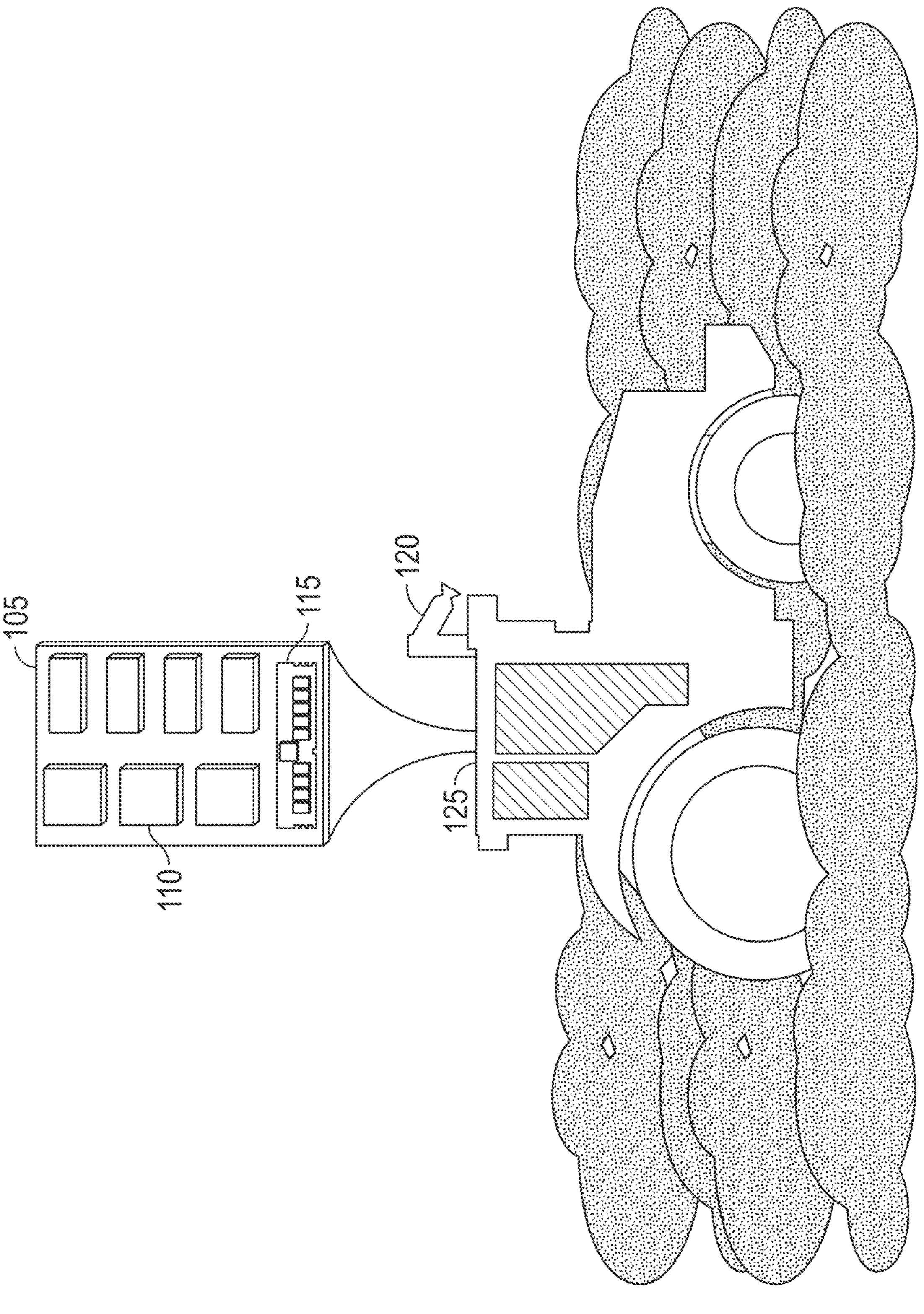
FIG. 1 is an example of an agricultural environment including a system for adaptive color transformation to aid computer vision.

Finding crops, crop rows or the like (e.g., identifying and indexing crops or rows) is, in some examples, an aspect of autonomous control for agricultural vehicle systems. An aspect of finding crops, crop rows in computer vision (CV) (e.g., without the aid of range finders, depth cameras, and the like) or the like includes identifying pixels that correspond to a crop (e.g., a crop row) and pixels that do not correspond to the crop (e.g., a furrow between crop rows, livestock, other vehicle or the like). Aspects of finding crops, crop rows or the like include, in other examples, detection of plants (potentially any plant) when contrasted against brown or non-green backgrounds; for example, weeds are detected in soil, furrows, or other non-crop areas.

Color information facilitates identification between crops and non-crops, such as rows, obstacles, livestock, or the like. However, the shades of green as well as shades of red, yellow or the like of crops and, similarly, tans, browns or reds of soil may, at times, blend together, vary because of light, shade or the like and frustrate identification of one or more of crop rows or furrows. Additionally, non-crop plants (e.g., weeds) of various colors (including shades of green) are interspersed in both the rows and the furrows, thereby further complicating row detection. Further, some crops change color in their lifecycle, based on differences in sunlight, nutrients, water, or the like. Crop row identification may be frustrated by these variations in color (e.g., from season to season, month to month, or even daily because of weather, lighting, shading or the like).

Further, still, in some examples processing color images involves significant resource expenditures to search for and identify items or lines corresponding to crop rows in the generally large color space (e.g., red, orange, yellow, green, blue, indigo, violet and colors therebetween). For instance, images or video taken with a color space having various colors, shades of those colors and hundreds, thousands, or more pixels in each image and analysis of these images or video consume significant processor resources, an issue further frustrated as the vehicle travels through a field and additional images and video are taken in an ongoing manner and require analysis to provide input for autonomous navigation, autonomous agricultural operation or both.

To address these issues, examples of adaptive color transformations are described herein. Systems and methods are described for optimizing conversion from, for example a red-blue-green (RGB) image data or other color data received from one or more color sensors (e.g., cameras, video cameras or the like) to single-channel image data, such that the resulting single-channel image is suitable for target detection (crop, crop row, weeds or the like) for various colors, various environmental conditions (e.g., ground color, primary crop color, secondary crop color, presence of weeds or pests other unwanted plants, illumination, and the like) or the like. Because each pixel of the resulting single-channel image contains fewer values (such as one value) in contrast to three values (RGB), and since this single value (or fewer values) encodes color information in contrast to a traditional black-and-white image, this image type is referred to herein in some examples as a single-value chroma (SVC) image.

Color transformation algorithms are described that reduce color complexity while increasing contrast between specified main colors that respectively corresponding to a target and non-target, such as crops or crop rows and furrows, respectively, regardless of colors present in the original RGB image. The color transformation algorithm examples include a linear relationship between color positions that is established in a multidimensional space. The line (e.g., vector) representing this linear relationship has an angle (referred to hereinafter as the "color angle") relative to the coordinate system of the multi-dimensional space. The color angle is used in the transformation, such that the 2-D point representing color is rotated (e.g., clockwise, or counterclockwise) by the color angle, and the resulting y-value is discarded leaving the x-value. For example, given a color angle $\alpha$ for the line V, and a coordinate of color DP in two dimensions (e.g., represented by (x, y)), then the one-dimensional representation of DP is $z=DP\times(\cos\alpha, \sin\alpha)$.

As discussed herein, the color angle is not defined or specified. Instead, the color angle is optionally adapted over time for improved row detection, for instance when crops change in color (e.g., for healthy or less healthy zones of a field), to detect plants against brown soil regardless of the presence of shadowing or different light conditions that make a green plant appear brown even. The color angle is optionally adapted for different types of crops, or for other reasons described herein. In another example, the color angle is adapted to detect the presence of weeds or other green plants in soil before or after crops are planted. Detection with the adapted color angle permits spray equipment to detect weeds and conduct autonomous targeted spraying, or to determine whether weeds have been removed from a field or other planting area. Additional details and examples are described below.

FIG. 1 is an example of an agricultural environment, such as a field, having an example of agricultural equipment 125 (AEQ) including, but not limited to, a tractor, combine, agricultural implement, combinations of the same or the like. An example system 105 for adaptive color transformation to aid computer vision (CV) is shown in FIG. 1. The environment includes the AEQ 125, such as a tractor, combine, implement or other agricultural system situated proximate to crop rows. The AEQ 125 includes one or more sensors 120, such as a color image sensor (e.g., camera) in communication with the system 105. The sensor 120 receives light in one or more of the visible spectrum, ultraviolet, or infrared, or combinations thereof. In an example, the one or more sensors 120 include a light sensor (including near visible light wavelength sensors) and includes or does not include a pattern-based or timing-based depth sensor, for example. Accordingly, in one example the output of the one or more sensors 120 include an image having elements (e.g., pixels, regions, and the like) representing wavelengths (e.g., colors, infrared or ultraviolet) or intensities (e.g., luminance) of light. While one sensor 120 is shown, two or more sensors 120 are optionally included, e.g., at various locations around the AEQ 125, oriented in various directions, or are provided remotely on other vehicles systems or static mounts.

In an example, the sensor 120 is mounted to the AEQ 125 and calibrated for use. Calibration includes, but is not limited to, specifying a mounting height, perspective angle, position on the AEQ 125, or the like. The calibration parameters are used in a homography to translate measurements from the image to the field, for example. These translations are used to generate one or more of steering parameters (instructions, cues, or the like) for a steering controller of the AEQ 125, indexed locations of targets such as crops, crop rows, weeds, furrows, or the like for targeted husbandry. The system 105 includes controller circuitry 110 and a memory 115 (e.g., computer readable media) in another example. The memory 115 is arranged to hold data and instructions for the controller circuitry 110.

Figure 2:
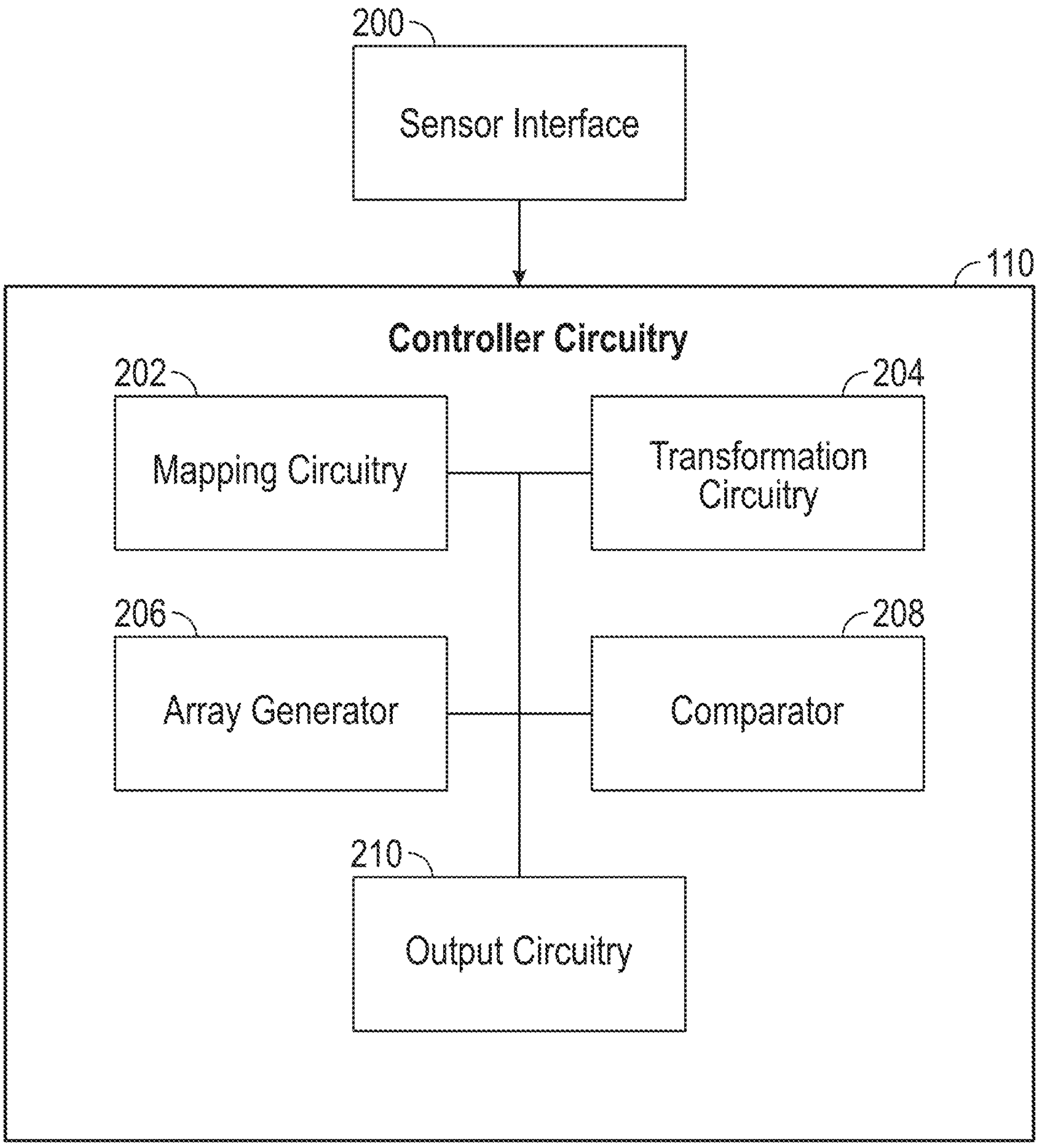
FIG. 2 is a schematic diagram illustrating an example of controller circuitry.

FIG. 2 is a schematic diagram of an example of the controller circuitry 110. Further image processing and transformation is described with reference to the components illustrated in FIG. 2.

To support CV navigation, including an adaptive color transformation, for the AEQ 125, the controller circuitry 110 obtains a color image (e.g., of a field that includes both crop rows and furrows), for instance through a sensor interface 200 in communication with the one or more sensors 120. Optionally, the image is obtained by the controller circuitry 110 retrieving the image from a buffer (e.g., in the memory 115) or receiving the image (e.g., directly from the sensor 120 via direct memory access (DMA)) or the like, via a sensor interface 200. As mentioned briefly earlier herein, the color images include RGB data as well as ultraviolent, infrared data or the like.

Mapping circuitry 202 maps RGB data (and optionally UV and IR data) to a single-value chroma (SVC) image. The RGB data and associated SVC image optionally include artifacts or other features that frustrate identification of targets. One example of these artifacts or other features includes shadow effects, for instance shadows cast by plant foliage, furrows or the like, variations in lighting or the like (because of clouds, precipitation, time of day). In some examples, plants may appear (inaccurately) brown if shadow effects, variations in lighting or the like are not addressed (e.g., removed, accounted, corrected or the like).

Mapping circuitry 202 performs color normalization to reduce the effects of shadows. Normalization can also help reduce effects of lighting variations at different times of day (e.g., noon, early morning, dusk, etc.) By reducing the effect of shadows, plants (whether crops, weeds, or unwanted plants) are identified more readily. In one example, normalization is conducted with a replacement of [R, G, B] with [R/(R+G+B), G/(R+G+B), B/(R+G+B)], which is an L^1 norm. Other normalization methods can be applied, and embodiments are not limited to any particular normalization method. For example normalization methods could include grey world normalization, histogram equalization, histogram specification, etc.

Generally, in an RGB image (optionally including UV or IR data), the intensity of each color for each pixel is represented in different channels. In an example, the color representation can include YUV (where Y is an expression of luminance and U and V are color components) although embodiments are not limited to YUV. As mentioned later herein, the luminance component (Y) is optionally discarded.

Figure 3:
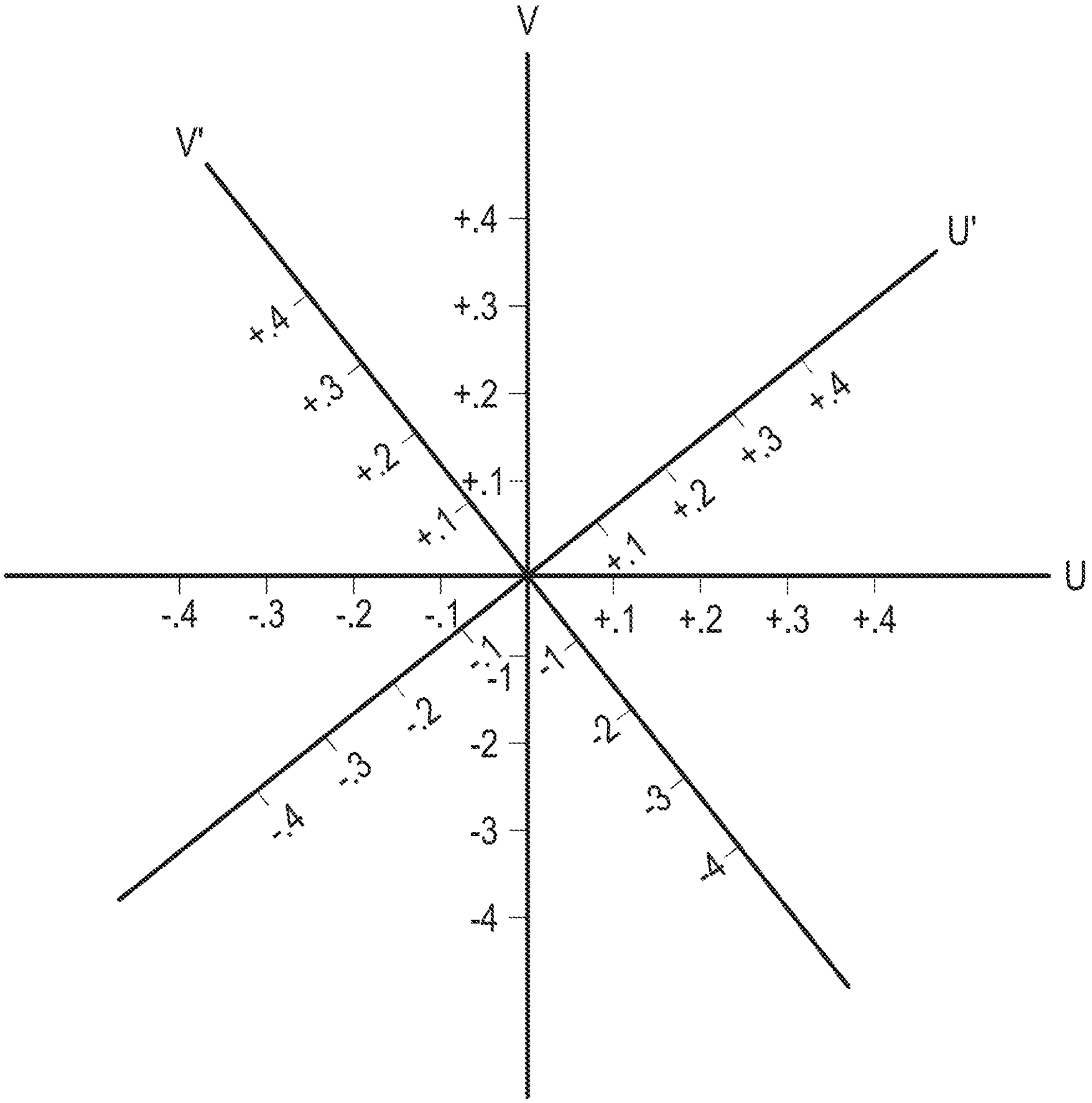
FIG. 3 illustrates a color plane, with rotated axes superimposed.

FIG. 3 illustrates the UV color plane, with rotated U'V' axes superimposed. Other color representations include YIQ (where I denotes an in-phase component and Q denotes a quadrature component), YDbDr (where Db and Dr are chrominance components representing blue and red differences, respectively), YCbCr (where Cb and Cr also represent blue and red differences, respectively), YPbPr (where Pb represents a difference between blue and luma and Pr represents a difference between red and luma), ICtCp (wherein I is an intensity or lumina component, Ct is a blue-yellow chroma component, and Cp is a red-green chroma component). As can generally be seen, each of these color representations is similar to RGB because each representation uses three values to represent a given color, but the meaning of these values differs. Generally, each has a luma or luminance channel and two chrominance channels (e.g., hue and saturation, blue-luma and red-luma, and the like). Thus, in these examples, if the original image is not represented by a color space containing luminance as one of its explicit components, then it is first transformed to a color space that does differentiate between color content (e.g., chrominance) and luminance (for example, as in the case of YUV, YPbPr, YCbCr or similar). Several conversion techniques can be used to accomplish this transformation, such as the International Telecommunications Union (ITU) Radiocommunication Sector (ITU-R) standards BT.601, BT.709, BT.2020, among others.

After the color image is obtained and optionally preprocessed, the technique involves finding a transformation of the remaining (e.g., two-channel) color to a reduced channel (e.g., a single channel or condensed representation) color scale. For example, the transformation will project a two-dimensional plane onto a one-dimensional line. To accomplish this, a set of reference points is created from the image. The reference points include, but are not limited to, all pixels in the image, a region of interest in the image, a uniformly distributed sub-set (e.g., a statistically relevant sample) or any other relevant set of points.

Referring again to FIG. 2, mapping circuitry 202 maps colors of a color image into a multi-dimensional space to generate a distribution of colors. In embodiments, a dimension of the multi-dimensional space corresponds to a color characteristic or component of a color (e.g., hue or saturation, intensity, color, brightness, and the like). The mapped colors are taken from the reference points (e.g., pixels) mentioned above. As briefly mentioned earlier herein, in an example, where the color representation of the image includes a luminance component (e.g., channel), the luminance component is not mapped to the multi-dimensional space. In an example, the multi-dimensional space is two dimensions (e.g., hue and saturation). Here, luminance is ignored because it generally does not differentiate between crop row pixels and furrow pixels and in some instances may bias the results. Thus, eliminating luminance in some examples enables a reduction in color complexity with few drawbacks, and potentially improved impact on the result. However, as noted below, if chrominance information alone is insufficient to differentiate between crop pixels and furrow pixels, the luminance is in some examples mapped into a dimension of the multi-dimensional space to produce an enhanced color transformation.

Once mapped into the multi-dimensional space, the mapping circuitry 202 analyzes the distribution of colors to find a direction of the distribution, also referred to as 'stretching' of the distribution in the coordinate system. If the distribution is stretched, the mapping circuitry 202 determines the direction of the stretching and uses this as the basis for a projection from one order to another (e.g., from two-dimensions to one dimension). If a stretch is not determined, then the color differentiation between the crop pixels and furrow pixels is, in some examples, potentially close and may be unreliable for row detection.

To determine the direction of the distribution's stretch, the mapping circuitry 202 is arranged to fit a line to the distribution. Here, the line includes the color angle relative to a coordinate system (e.g., UV coordinate system as shown in FIG. 3) of the multi-dimensional space that represents the direction of the stretch. This approach permits a distributed spread (e.g., specified distribution, maximized distribution) of the data points in the lower dimension after the transformation. The rotation produces a U'V' image (for example) as shown with the U'V' axes of FIG. 3. The V' component is optionally discarded as discussed herein and the remaining U' component is the SVC result.

In the examples described herein, the colors are mapped to a three-dimensional coordinate system, such as red, green, and blue (RGB), or luminance, hue, and saturation. In fact, in other examples a greater number of dimensions are used for images that have greater color depths, such as infrared and ultraviolet. As long as the distribution is not an n-sphere (e.g., a circle when n=2, a sphere when n=3, and in similar situations), then the resulting measurement of the stretch (e.g., line fitting) results in an angle between two of the dimensions used to adaptively reduced the color complexity into a single dimension. In an example, this process repeated until the final reduced image has fewer dimensions of color complexity, such as a single dimension of color complexity. The following line-fitting descriptions are illustrated in a two-dimensional space, but the techniques are generally applicable in higher order dimensions.

Many line fitting techniques can be used. In one example, the line fitting is accomplished by applying a linear regression to the distribution. In another example, the line fitting is accomplished by clustering points of the distribution and connecting a first centroid of a first cluster to a second centroid of a second cluster to find the line. In yet another example, the line fitting is accomplished by performing an angular scan from a centroid of the distribution. In still another example, the line fitting is accomplished by applying a theta distribution.

Other example line fitting techniques include, but are not limited to, applying a random consensus sample (RANSAC) line model to the distribution. RANSAC operates similarly to a linear regression with the rejection of outliers. Generally, a series of linear models are fit to random samples of the data. The linear model that best fit the data is selected. This operates on the assumption that inliers have a non-random relationship, and thus will exert an influence across the random samples. In another example, line fitting is accomplished by applying a standard deviational ellipse to the distribution. The standard deviational ellipse is applied by calculating the standard distance separately in the dimensions (e.g., x and y directions in a two-dimensional space). These two measures specify the axes of an ellipse encompassing the distribution of features. The major axis of the standard deviational ellipse is used at the fit line for the purposes of finding the color angle to the coordinate system.

Once the color angle of the line fit to the distribution is determined, the transformation circuitry 204 transforms the colors in the image based on the color angle to produce a reduced image. Here, the transformation reduces a color complexity of the image. Generally, the transformation translates the distance between the distribution of points of two dimensions on to a single dimension, to increase contrast (e.g., enhance separation, distinctiveness, or similar parameters) between the colors. An example of the transformation from a two-dimensional space to a one-dimensional space includes:

Given:

Direction a vector $V=(\cos \alpha, \sin \alpha)$; and

Data Points $DP=(x, y)$, then

Scalar (e.g., one-dimensional) point $z=DP\times V$.

Here, a scale factor is applied to z to fit specified data ranges for crop related row processing.

Figure 4:
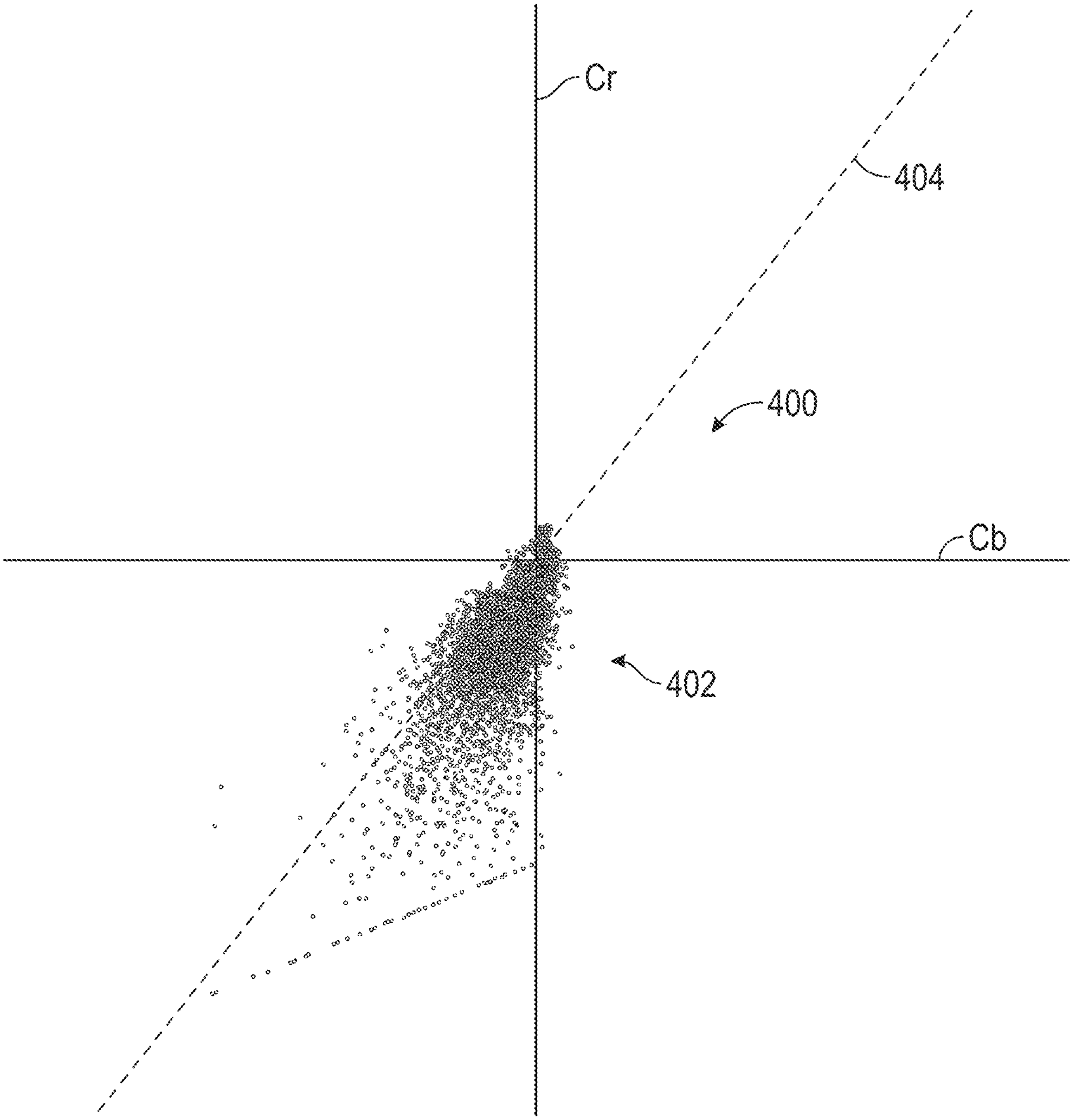
FIG. 4 is a plot of an example color distribution for a soybean crop.

FIG. 4 illustrates how the colors of a soybean field (within a region of interest) map to the UV plane. The vegetation colors lie mostly in the bottom left of the point cluster, while the soil colors lie mostly near the origin. When mapped to the U' axis 404, there is a periodic variation in the U' value versus lateral position. The color angle 400 applied in FIG. 4 is 51 degrees and was determined by experimental processes to be an accurate color angle for soybean crops at a particular stage of soybean crop development. As can be seen in FIG. 4, the color distribution 402 is along the axis 404 near the color angle 51 degrees.

In some examples the previous color angle is potentially less ideal for other crops, or for crops at other stages of development, for weed detection or detection of shadows, or other use cases. As noted above, the effectiveness of the transform is optionally tied to the directionality, or stretch, of the color distribution in the multi-dimensional space, where the directionality relates to color angle. This directionality or stretch may vary depending on the colors present in, e.g., the agricultural field and observed with the one or more sensors. It follows, therefore, that the color angle used in the transformations described herein has a role in determining the effectiveness of the transforms in representing the colors in the agricultural field.

Figure 5:
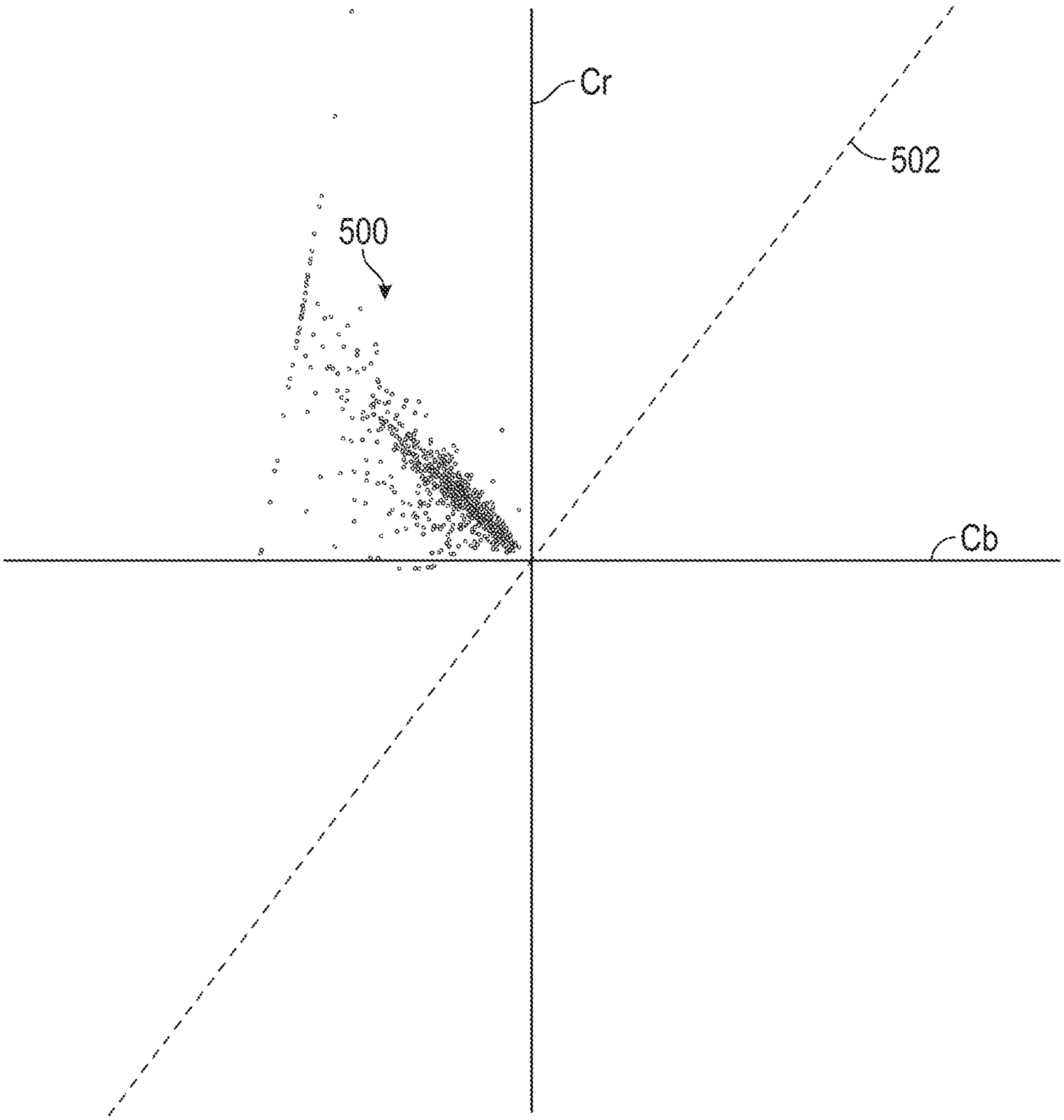
FIG. 5 is a plot of another example color distribution for a different crop.

For example, as seen in FIG. 5, attempts to use the same (e.g., 51 degrees) color angle results in the color distribution 500 not comporting to the color angle as represented in line 502, such that the line 502 does not represent the direction of stretch of the color distribution 500. The color distribution 500 in this example represents one or more of a different crop (e.g., crops that generally are not a shade of green, such as flowers), a crop at a different stage of development (e.g., sprouts, juvenile, mature, plants that have already been harvested) such that colors change from, e.g., bright green to dull green to brown, crops in shade, crops subject to variations in lighting, combinations of the same or the like. The color distribution 500, in other examples, represents crops that are not arranged in a row formation.

Referring again to FIG. 2, systems and methods of embodiments address these concerns by determining the color angle to use in the above-described transformation, based on various criteria and algorithms as implemented within example array generators (e.g., 206) and comparators (e.g., 208) as described herein.

In examples, the array generator 206 generates a plurality (e.g., an array) of condensed representations of the distribution of colors, using mapped images provided by the mapping circuitry 202. In examples, a condensed representation comprises an SVC as described earlier herein. For example, each condensed representation in the array is generated by rotating a color distribution in multi-dimensional space (e.g., UV) by a different color angle. The rotation produces a U'V' image (for example) as mentioned earlier herein with reference to FIG. 3. The V' component is optionally discarded, leaving a U' component as an SVC result. However, embodiments described herein are not limited to particular types of color distribution.

The array generator 206 generates one or more condensed representations at various color angles. For example, condensed representations are generated in degree increments (or fractions or multiples of one degree) of color angle from 0 degrees to 360 degrees or ranges therein. The number of condensed representations generated, and the range of color angles varies in some examples depending on predicted color angles for the crop, time of year, light conditions, or similar criteria, as predicted by machine learning algorithms or as provided by remote or local memory, manufacturer specifications, or the like. The number of condensed representations is, in some examples, limited to conserve computing resources or based on latency concerns.

Next, a comparator 208 selects one or more of the condensed representations. The selection (including selections) is based on computed energy values for all or a subset of the arrays of condensed representations. The energy values are calculated or defined (collectively, determined) according to equations provided below.

In examples, the comparator 208 determines an energy value in each condensed representation (or subset thereof) as the respective condensed representation varies throughout the image. As mentioned above, the condensed representation includes an SVC. A baseline energy value is determined for baseline variations, such as random variations in soil color.

Figure 6:
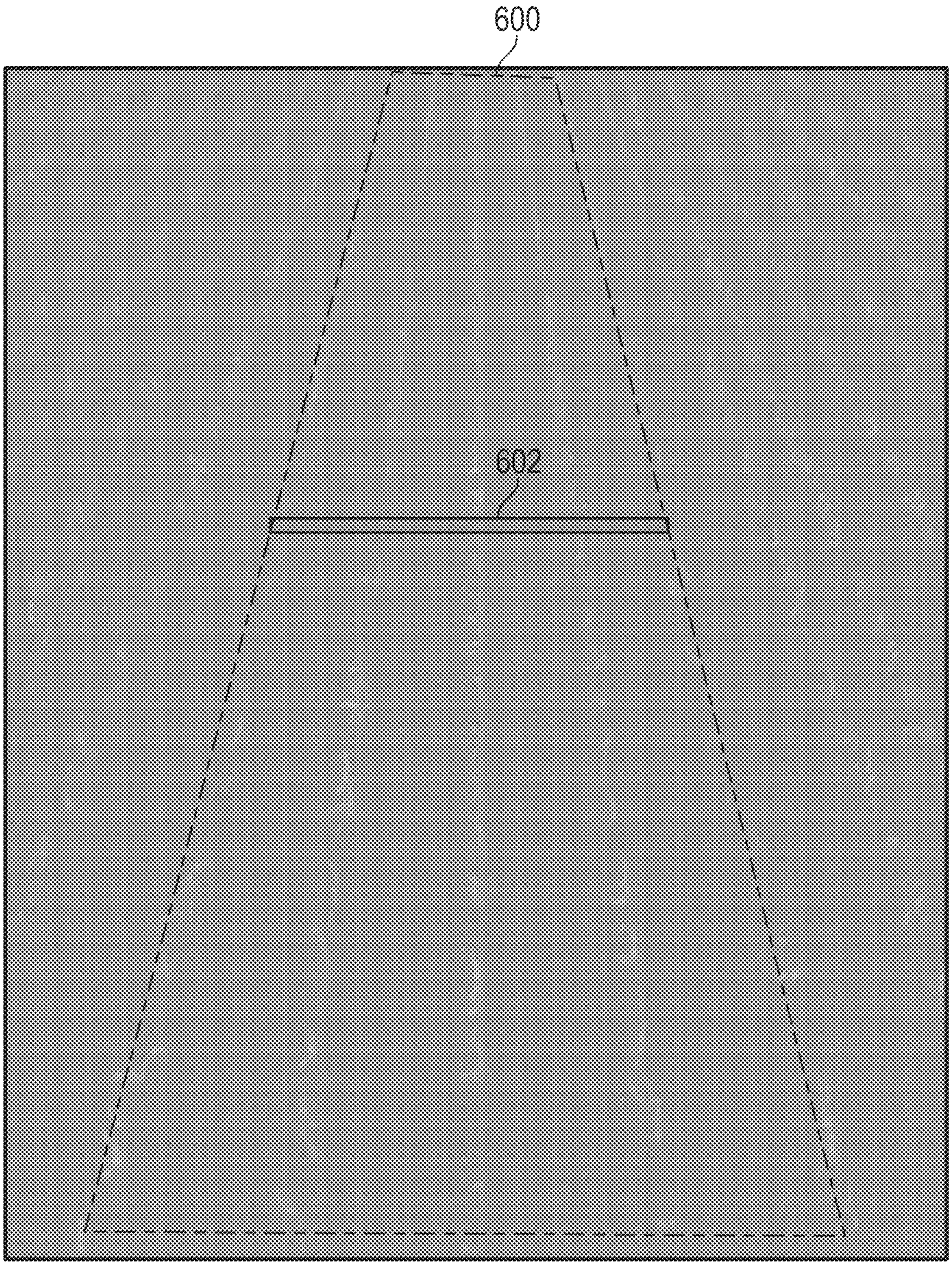
FIG. 6 is a perspective view of a region of interest and example scan lines.

Energy measurements and values include, in various examples, a signal-to-noise ratio (SNR), although embodiments are not limited to SNR measurements of energy. SNR is measured by selecting a region of interest where one or more integer "k" soil-crop-soil periods are predicted to exist. FIG. 6 illustrates a region of interest 600. Then, for each scan line 602 in that region of interest, a Discrete Fourier Transform (DFT) is calculated, according to the DFT equation, X_k=sum (x_n*^ (−i*2*pi*k*n/N)) for integers n in [0, N−1]. A scan line is, in some examples, a horizontal row of pixels in an image (e.g., scan line 602 in FIG. 6). The region of interest in embodiments optionally defines the starting and ending column indices for each scan line 602.

Next, the comparator 208 determines an image data energy value (e.g., a non-noise energy value) for the given condensed representation. For instance, the image data energy value is determined according to (X_k/N)^2, where X_k is the DFT magnitude at the k-th frequency component of the DFT, and N is the number of pixels used in the DFT calculation (e.g., the number of pixels in the scan line within the region of interest). The comparator 208 determines a total energy value, in another example, by generating a sum of condensed representation (or, e.g., SVC) values according to sum(x[n]^2)/N, where x[n] is the condensed representation (SVC) value of the nth pixel used in the DFT calculation, and N is the number of pixels used in the DFT calculation, and wherein the summation is performed for integer values of n in the interval [0, N−1]. A scan line SNR is determined by dividing the image data energy value by the total energy. The SNR of all scan lines is optionally combined using, for example, an average, or an average of the highest 90%, or similar criteria or formulas.

The above calculations are interpreted to calculate an SNR for each scan line, combine the SNRs into a composite SNR for each color angle, and choose a color angle based on the combined SNR as described below with reference to FIG. 7. In other examples, a color angle is instead chosen for each scan line based on the SNR for that scan line. The color angles for all of the scan lines are optionally combined into one overall color angle value for use in subsequent processing.

Regardless of how energy is computed for each condensed representation in the array, the comparator 208 determines the condensed representation that provides a specified energy value (e.g., depending on selection criteria, highest energy value or the like). Because each condensed representation was generated through rotation by a color angle (as described earlier herein), the comparator 208 facilitates mapping of color angles to respective SNR values to determine the color angles associated with high SNR values.

Figure 7:
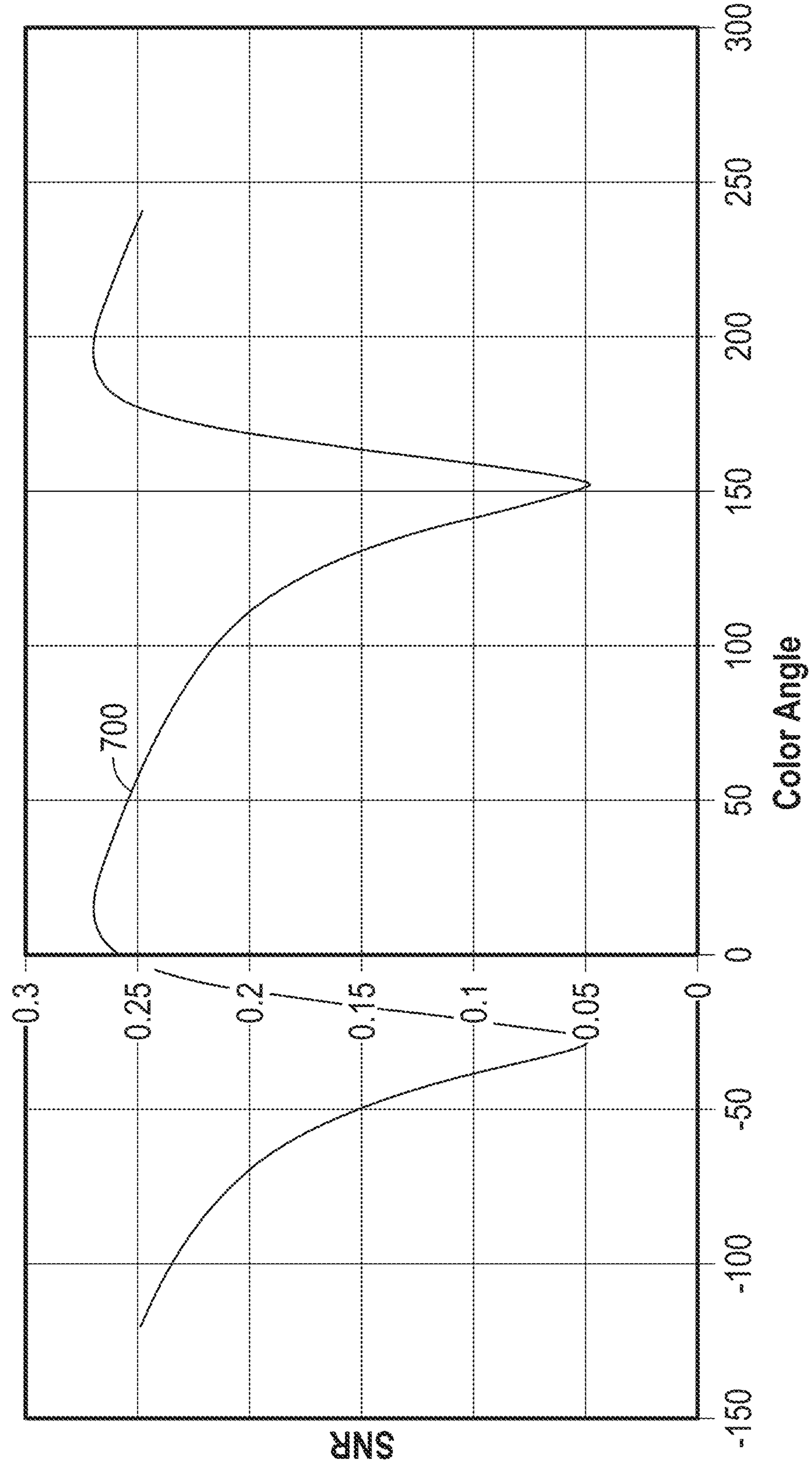
FIG. 7 is an example plot of a curve mapping signal-to-noise ratio to different color angles for soybeans.
Figure 8:
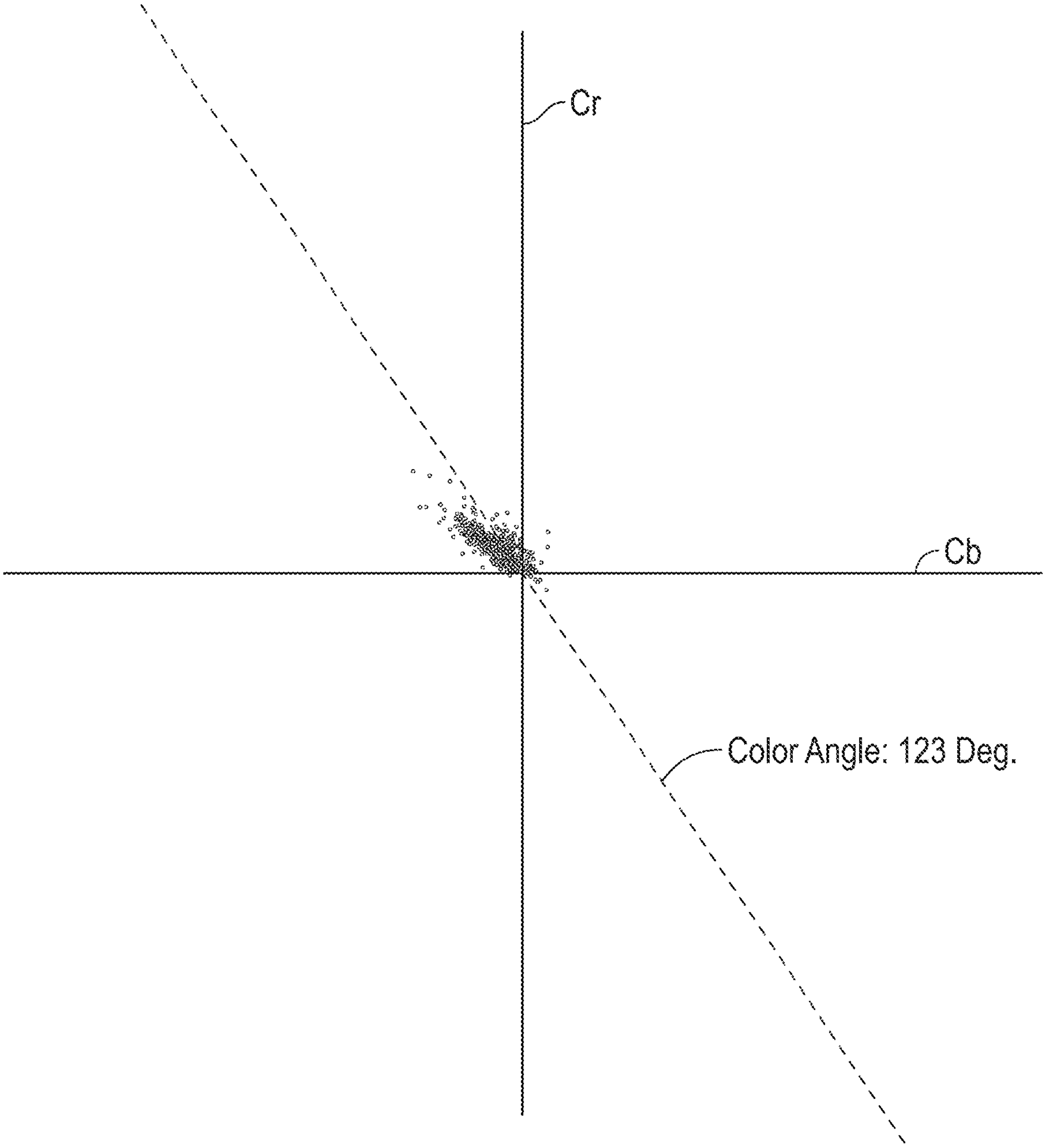
FIG. 8 is a plot of an example color distribution and color angle for a crop.
Figure 9:
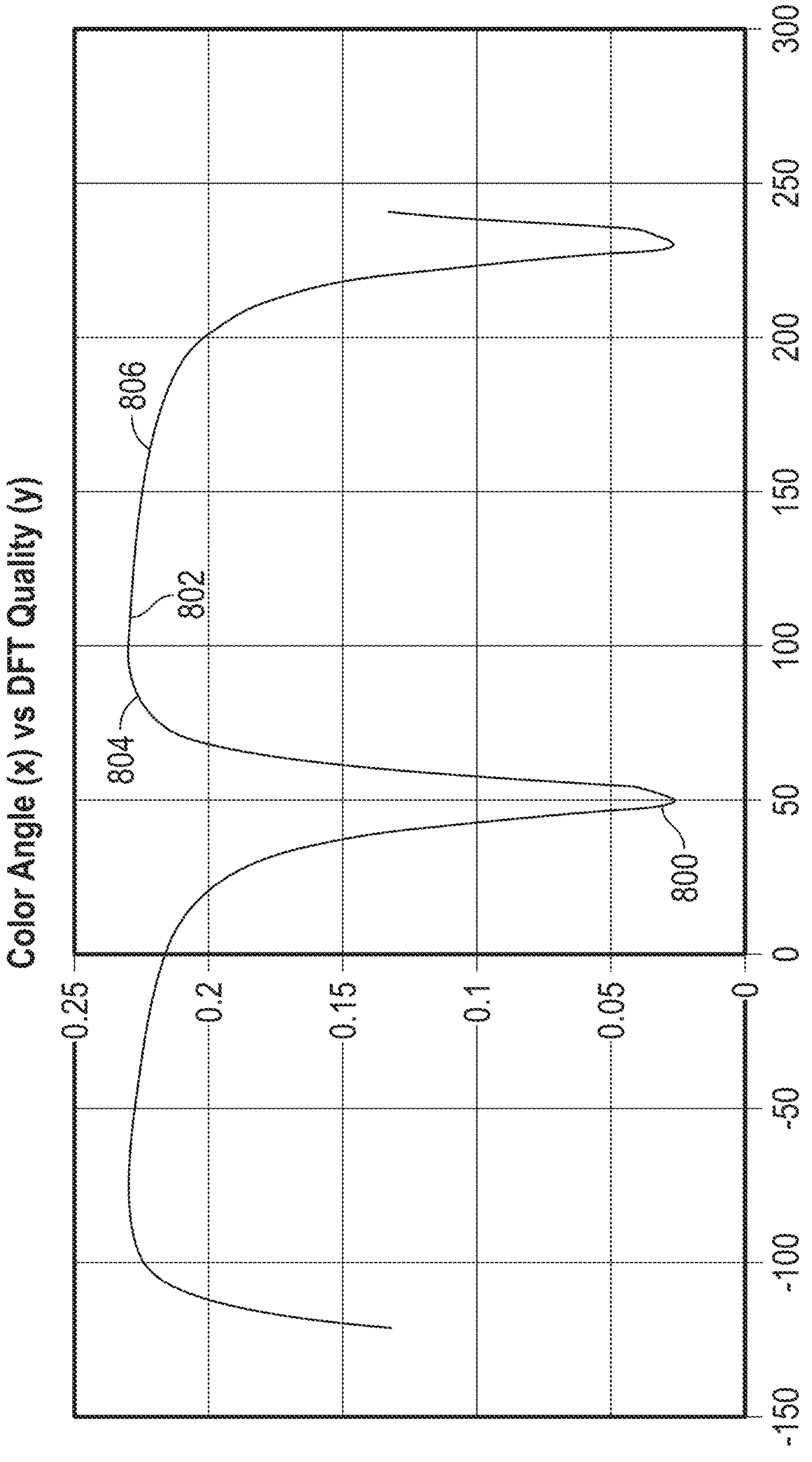
FIG. 9 is an example plot of curve mapping signal-to-noise ratio to different color angles for the color distribution of FIG. 8.

FIG. 7 is an example of a curve mapping SNR to different color angles for soybeans according to some embodiments. As shown, the color angle at about 51 degrees is near a peak SNR at point 700. As mentioned above, peak SNR may occur at other color angles for other crops or under other conditions. For example, given a color image of a different crop under different conditions, a color distribution according to FIG. 8 is generated, with a color angle of about 123 degrees. FIG. 9 is a curve mapping SNR to different color angles for the color distribution of FIG. 8. As seen in FIG. 9, an angle of 51 degrees would provide proximate to a minimum SNR, as shown at point 800. In contrast, a maximum occurs at about point 802, or 123 degrees.

In some examples, the color angle that produces the highest SNR is specified (e.g., selected). In other examples, (e.g., as seen in FIG. 9) a range of angles 804 to 806 are observed proximate the maximum (including potential multiple maxima). In these or other examples, different color angle selection criteria are optionally used. For example, two color angles are selected on either side of the color angle providing an elevated SNR (or a point where the SNR crosses a specified threshold, e.g., 90% of the maximum SNR), and an average of those two angles is selected. In other examples, an average of angles is determined by mapping color angles in the interval (0, pi radians) to the interval (0, 2*pi radians), computing the average using a tan 2(avg(sin(mapped_angles)), avg(cos(mapped_angles))), then unmapping the result back to the interval (0, pi radians).

Referring again to FIG. 2, once a color angle is selected according to any of the algorithms or criteria describe above, transformation circuitry 204 generates a reduced image of an agricultural field by transforming colors in the color image based on the color angle used to generate the high energy condensed representation. For example, the selected color angle represents the rotation relative to the defined two-dimensional coordinate system (e.g., UV in FIG. 3) that produces a U'V' image (e.g., U'V' in FIG. 3). The V' component is optionally discarded and the remaining U' component is the SVC result.

Figure 10:
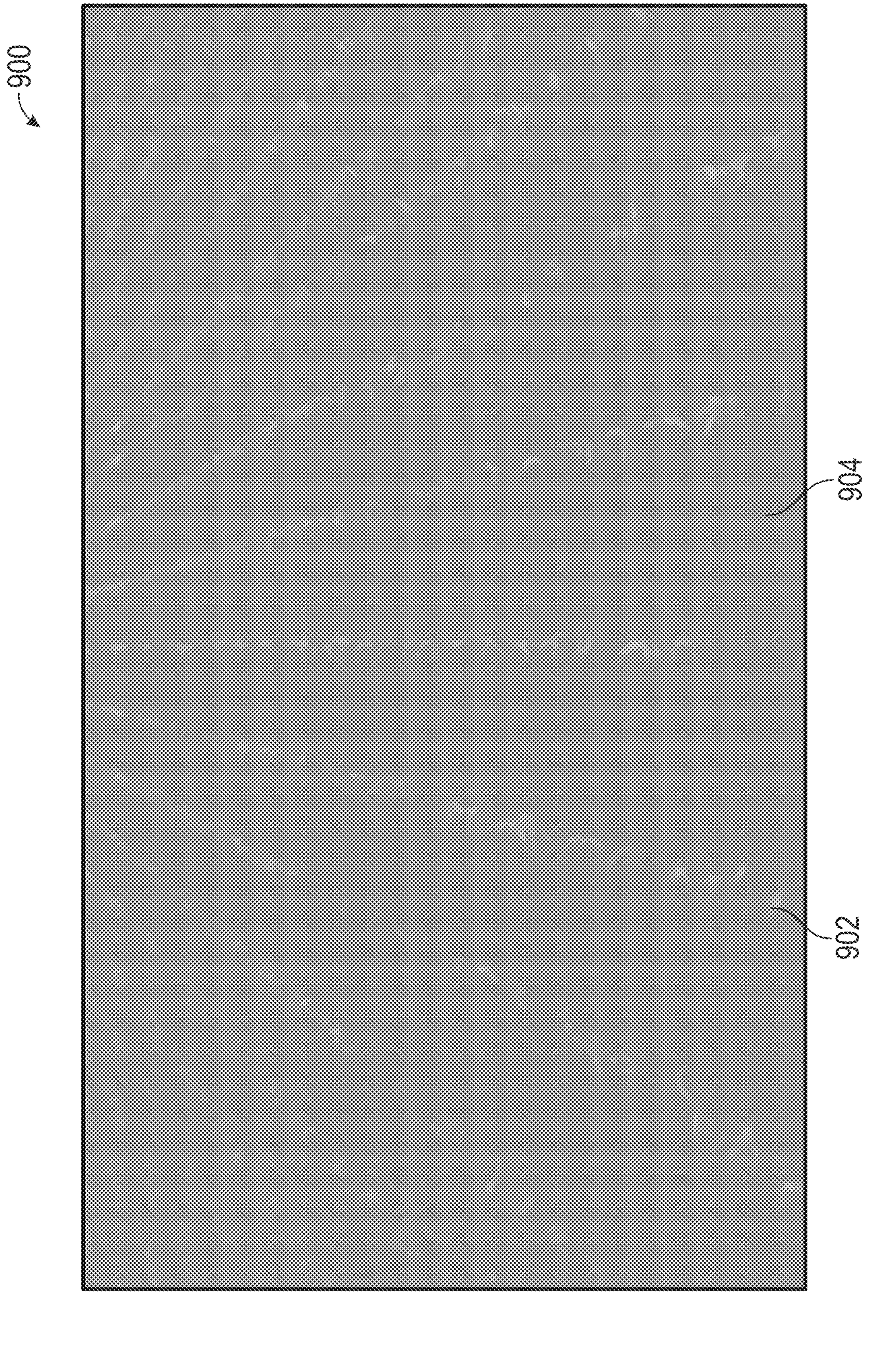
FIG. 10 is an example single value chroma image.

When rendered graphically, the SVC image is optionally provided as a grayscale image. FIG. 10 illustrates an example SVC image 900. Once the SVC image 900 is produced, the row location 902 is detected based on the variation in the SVC value. Furrows 904 or other non-crop locations are optionally detected. Once the SVC image is produced, row location is detected based on the variation in the SVC value. FIG. 10 is an example, and the SVC image 900 includes, in other examples, crops not planted in rows, weeds within fallow ground or within furrows between rows, or the like.

Referring again to FIG. 1, the SVC image (e.g., reduced image) is provided by the output circuitry 210 (FIG. 2) to display circuitry of the AEQ 125. In examples, the output circuitry 210 provides the reduced image to a receiver. Generally, a steering controller of the AEQ 125 is the receiver, however, an intermediary can also be the receiver where the intermediary uses the reduced image to calculate the track-angle error (TKE) and cross-track distance (XTK) values for the steering controller. In an example, the controller circuitry 110 is itself the receiver to also process some or all of the TKE or XTK from the reduced image. Communicating the reduced image includes placing the reduced image in a data structure in the memory 115 or transmitting a representation of the reduced image over an interlink (e.g., bus, network, or similar circuitry).

Figure 11A:
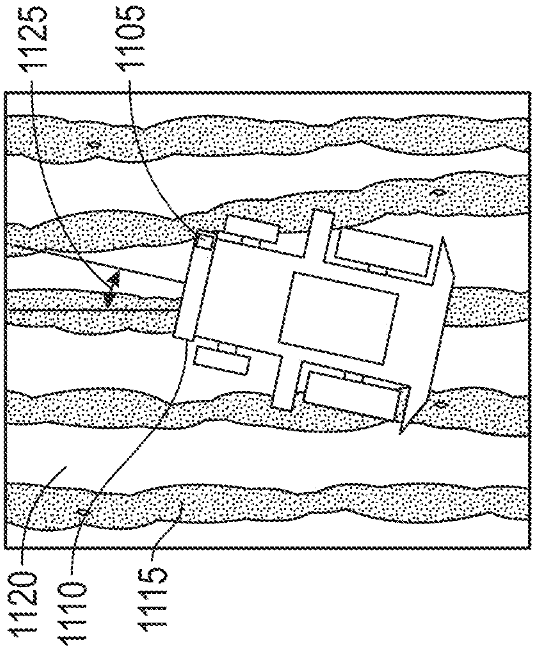
FIGS. 11A-11B illustrate various example components and relationships of an agricultural equipment in an operating environment.
Figure 11B:
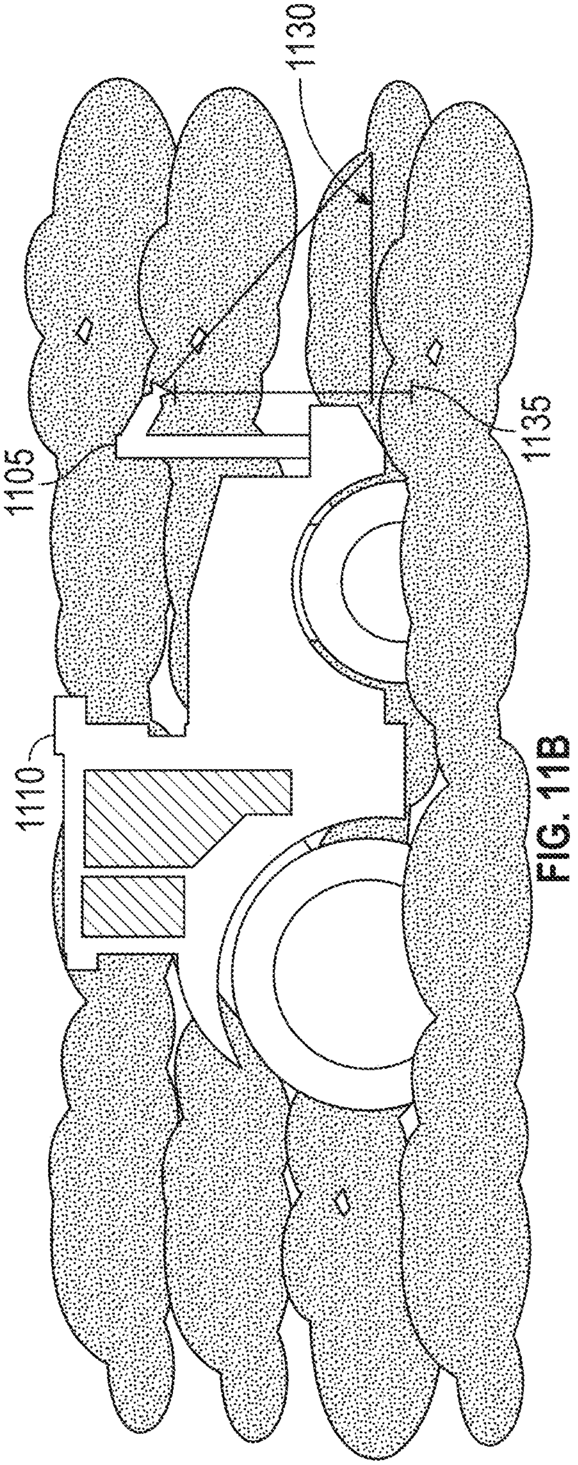

FIGS. 11A-11B illustrate various components and relationships of an AEQ in an operating environment, according to an embodiment. FIG. 11A is a top-down view of an AEQ 1110 in a field. The shaded portions represent crop rows 1115 and the space between the crop rows 1115 are furrows 1120. While rows 1115 are shown, fields can include crops not planted in rows, or fallow ground having weeds or other unwanted plants to be sprayed by a sprayer, for example. The AEQ 1110 includes one or more sensor/s 1105 mounted to the front side of the AEQ 1110. Here, the AEQ 1110 is not aligned with the crop rows 1115 or furrows 1120 but deviates by TKE 1125. A steering controller of the AEQ 1110 is arranged to steer the AEQ 1110 to be in line with the crop rows 1125 with wheels in the furrows 1120.

FIG. 11B illustrated a side view of the AEQ 1110 with the front mounted sensor 1105. The height 1135 of the sensor 1105 and the angle to the ground 1130 are calibration parameters for the CV system. These parameters can be provided by a user or can be auto-calibrated. Auto-calibration can take several forms, such as using a range-finder (e.g., ultrasonic, radar, laser, and the like), or can be performed periodically depending on crop type, time of year, and the like.

Embodiments described herein enable robust crop related row detection considering local disturbances (e.g., the presence of weeds, missing crops, and the like) and considering variations in color throughout a growing season, and variations in the type of crop planted. Embodiments provide crop related row detection across a wide range of crop and substrate colors, enabling the technique to be applied, without modification, to different crops in different environments.

This method of embodiments differentiates crop and soil but does not identify which is which. In order to correctly identify crop and soil, methods include receiving operator feedback or sensor feedback (e.g., depth from a stereo camera). In other embodiments, a field calibration routine is initiated wherein the position of the camera relative to the center of the vehicle is a known value, the distance from the vehicle's wheels to the center of the vehicle is a known value, and the operator is instructed to manually steer the vehicle's wheels between the crop rows.

Figure 12:
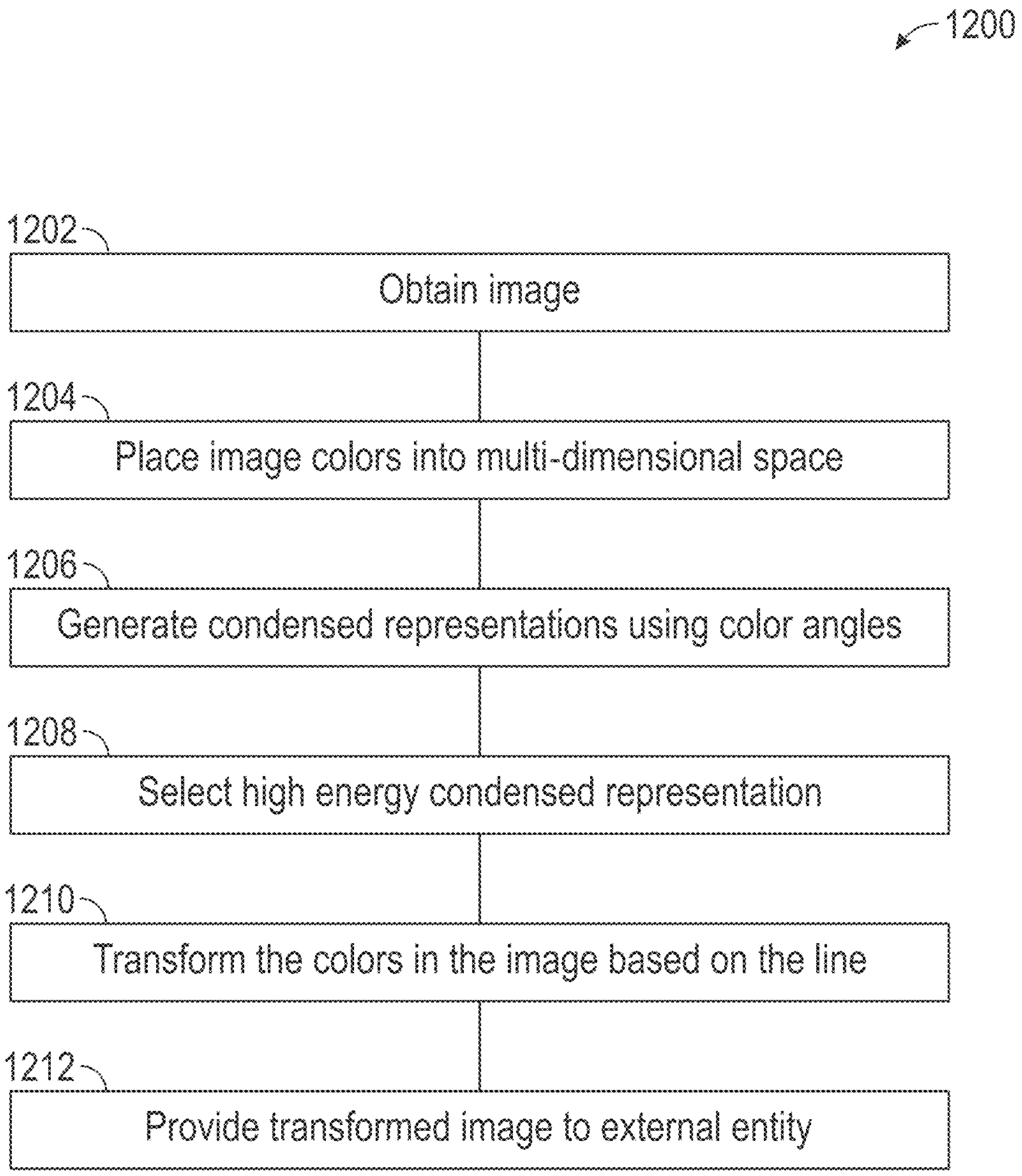
FIG. 12 is a block diagram showing one example of a method for adaptive color transformation to aid computer vision.

FIG. 12 illustrates a flow diagram of an example of a method 1200 for adaptive color transformation to aid CV, according to an embodiment. The operations of the method 1200 are implemented and performed by hardware, such as that described above (e.g., controller circuitry). The method 1200 can be initiated periodically, in an ongoing manner, or upon user request, for example.

At operation 1202, controller circuitry 110 obtains a color image of an agricultural field having one or more crop rows. The color image is preprocessed from a first color representation without a luminance component of a color to a second color representation that includes a luminance component. The first color representation can be red-green-blue. The second color representation can include a luminance component (Y) and two color components (UV)

At operation 1204, controller circuitry 110 maps colors of the color image into a multi-dimensional space to generate a distribution of colors. A dimension of the multi-dimensional space may correspond to a color characteristic. The multi-dimensional space can be two dimensions. The mapping can include reducing shadow effects within the color image. Reducing shadow effects can include normalizing the first color representation. Mapping colors of the color image can include discarding a value of the second color representation. The discarded value can be a component of the color space that is orthogonal to the component whose SNR is being measured. In aspects of the disclosure, removing shadow effects helps avoid issues in which plants appear brown under shadow effects when the plants are actually green. For example, weeds can sometimes appear brown when shadow effects remain, but will be shown as green when shadow effects are removed. Therefore, removing shadow effects can increase efficacy of weed sprayers by improving weed detection.

At operation 1206, controller circuitry 110 generates an array of condensed representations of the distribution of colors. A condensed representation of the array is generated by rotating the distribution of colors by a color angle about an axis perpendicular to the multi-dimensional space.

At operation 1208, controller circuitry 110 selects a high energy condensed representation of the array having an energy value greater than energy values of other condensed representations in the array. Energy values can be computed according to SNR computations described above.

At operation 1210 controller circuitry 110 generates a reduced image of an agricultural field by transforming colors in the color image based on the color angle used to generate the high energy condensed representation.

At operation 1212 controller circuitry 110 outputs the reduced image of the agricultural field to display circuitry of an agricultural vehicle.

Figure 13:
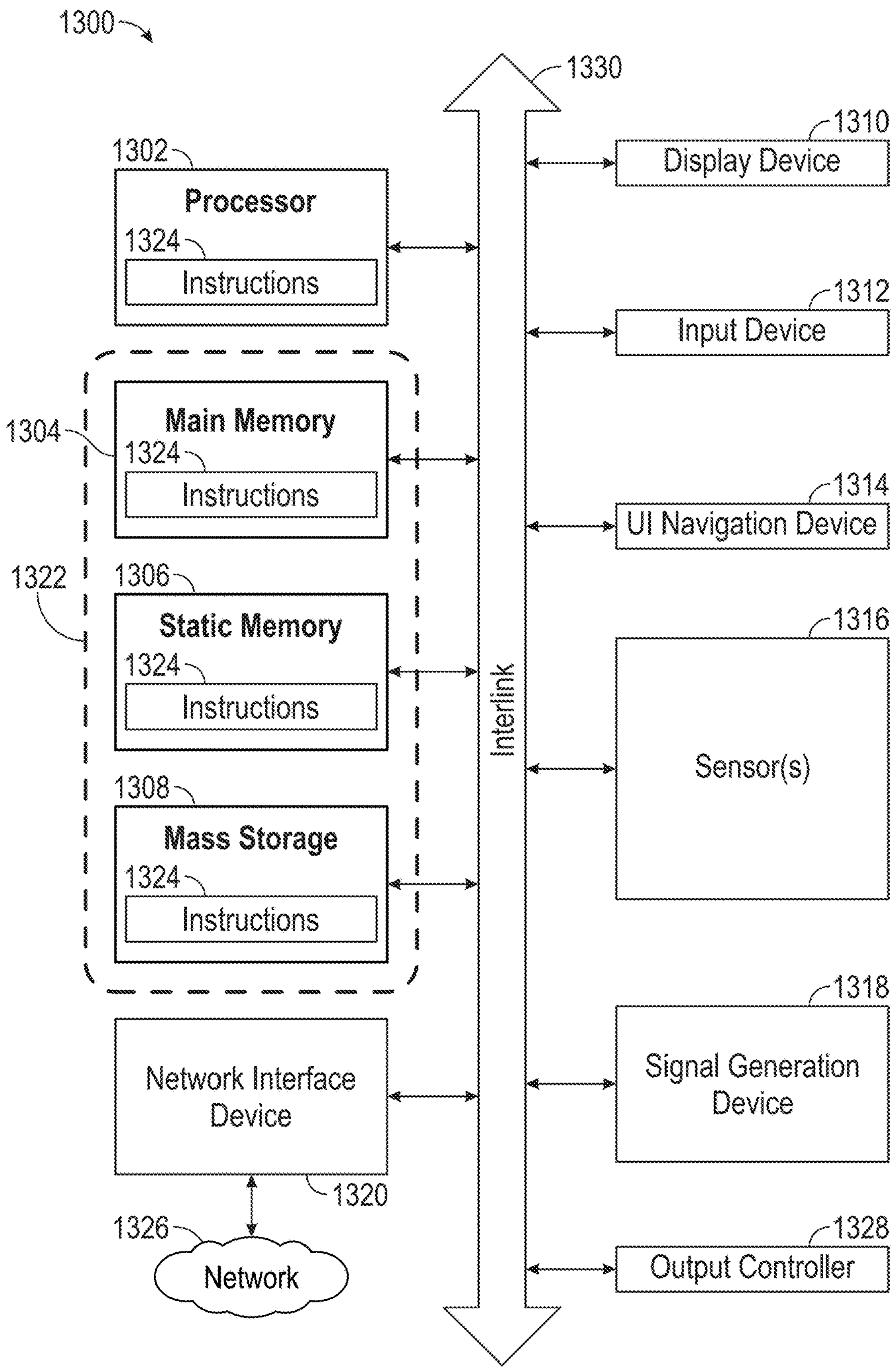
FIG. 13 is a schematic diagram illustrating one example of a machine upon which one or more embodiments may be implemented.

FIG. 13 illustrates a block diagram of an example machine 1300 upon which any one or more of the techniques (e.g., methodologies) discussed herein can be performed. Examples, as described herein, can include, or can operate by, logic or a number of components, or mechanisms in the machine 1300. Circuitry (e.g., controller circuitry) is a collection of circuits implemented in tangible entities of the machine 1300 that include hardware (e.g., simple circuits, gates, logic, or similar elements). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, and the like) including a machine readable medium physically modified (e.g., magnetically, electrically, moveable placement of invariant massed particles, and the like) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1300 follow.

In alternative embodiments, the machine 1300 can operate as a standalone device or can be connected (e.g., networked) to other machines. In a networked deployment, the machine 1300 can operate in the capacity of a server machine, a client machine, or both in server-client network environments. In an example, the machine 1300 can act as a peer machine in peer-to-peer (P2P) (or other distributed) network environment. The machine 1300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1300 can include a hardware processor 1302 (e.g., a central processing unit (CPU), a graphics processing unit (GPU), a hardware processor core, or any combination thereof), a main memory 1304, a static memory (e.g., memory or storage for firmware, microcode, a basic-input-output (BIOS), unified extensible firmware interface (UEFI), and the like) 1306, and mass storage 1308 (e.g., hard drive, tape drive, flash storage, or other block devices) some or all of which can communicate with each other via an interlink (e.g., bus) 1330. The machine 1300 can further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 can be a touch screen display. The machine 1300 can additionally include a storage device (e.g., drive unit) 1308, a signal generation device 1318 (e.g., a speaker), a network interface device 1320, and one or more sensors 1316, such as a global positioning system (GPS) sensor, compass, accelerometer, or other sensor. The machine 1300 can include an output controller 1328, such as a serial (e.g., universal serial bus (USB), parallel, or other wired or wireless (e.g., infrared (IR), near field communication (NFC), or similar systems) connection to communicate or control one or more peripheral devices (e.g., a printer, card reader, and the like).

Registers of the processor 1302, the main memory 1304, the static memory 1306, or the mass storage 1308 can be, or include, a machine readable medium 1322 on which is stored one or more sets of data structures or instructions 1324 (e.g., software) embodying or utilized by any one or more of the techniques or functions described herein. The instructions 1324 can also reside, completely or at least partially, within any of registers of the processor 1302, the main memory 1304, the static memory 1306, or the mass storage 1308 during execution thereof by the machine 1300. In an example, one or any combination of the hardware processor 1302, the main memory 1304, the static memory 1306, or the mass storage 1308 can constitute the machine-readable media 1322. While the machine readable medium 1322 is illustrated as a single medium, the term "machine readable medium" can include a single medium or multiple media (e.g., a centralized or distributed database, and/or associated caches and servers) configured to store the one or more instructions 1324.

The term "machine readable medium" can include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon based signals, sound signals, and the like). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 can be further transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), and the like). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 can include one or more physical jacks (e.g., Ethernet, coaxial, or phone jacks) or one or more antennas to connect to the communications network 1326. In an example, the network interface device 1320 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software. A transmission medium is a machine-readable medium.

ADDITIONAL NOTES AND EXAMPLES

Example 1 is a system for adaptive color transformation to aid computer vision, the system comprising: a sensor interface configured to couple with one or more color image sensors; and controller circuitry in communication with the sensor interface to receive a color image, wherein the controller circuitry includes: mapping circuitry configured to map colors of the color image into a multi-dimensional space to generate a distribution of colors in the color image, a dimension of the multi-dimensional space corresponding to a color characteristic; an array generator configured to generate an array of condensed representations of the distribution of colors, wherein a condensed representation is generated by rotating the distribution of colors by a color angle about an axis perpendicular to the multi-dimensional space; a comparator configured to select a high energy condensed representation of the array having an energy value greater than energy values of other condensed representations in the array; transformation circuitry configured to generate a reduced image of an agricultural field by transforming colors in the color image based on the color angle used to generate the high energy condensed representation; and output circuitry configured to output the reduced image of the agricultural field to display circuitry of an agricultural vehicle.

In Example 2 the subject matter of Example 1 can optionally include wherein the comparator is configured to compute energy values by computing a signal-to-noise ratio (SNR) for each condensed representation in the array by: selecting a region of interest in the color image; for each subsection in the region of interest, computing a Discrete Fourier Transform (DFT); computing a signal energy based on the DFT and a total energy based on a sum of signal energies for each scan line; and determining the SNR by dividing the signal energy by the total energy.

In Example 3, the subject matter of Example 2 can optionally include wherein the comparator is configured to select the condensed representation and corresponding color angle having an increased SNR relative to other SNRs.

In Example 4, the subject matter of Example 2 can optionally include 4 wherein the controller circuitry is configured to: identify a plurality of color angles within a threshold of a color angle corresponding to a condensed value that provides an increased SNR relative to other SNRs; calculate an average of the plurality; and provide the average as the selected color angle.

In Example 5, the subject matter of any of Examples 1-4 can optionally include wherein the controller circuitry is configured to receive operator feedback to differentiate different portions of the color image.

In Example 6, the subject matter of any of Examples 1-5 can optionally include a user input device, and wherein the controller circuitry is configured to initiate the mapping of colors of the image into the multi-dimensional space upon user input using the user input from the user input device.

In Example 7, the subject matter of any of Examples 1-6 can optionally include wherein the controller circuitry is configured to initiate the mapping of colors of the image into the multi-dimensional space in an ongoing manner.

In Example 8, the subject matter of any of Examples 1-7 can optionally include wherein the controller circuitry is configured to change the mapping of colors of the image into the multi-dimensional space in response to a quality indicator being below a quality threshold.

In Example 9, the subject matter of any of Examples 1-8 can optionally include a user display for displaying the reduced image.

In Example 10, the subject matter of Example 9 can optionally include wherein the user display is configured to further display other color images from one or more color image sensors.

In Example 11, the subject matter of any of Examples 1-10 can optionally include one or more color image sensors.

In Example 12, the subject matter of any of Examples 1-11 can optionally include wherein the output circuitry is configured to output the reduced image of the agricultural field to an autonomous driving controller.

In Example 13, the subject matter of any of Examples 1-12 can optionally comprise receiver circuitry and wherein the system is incorporated locally to an agricultural vehicle.

In Example 14, the subject matter of any of Examples 1-13 can optionally include wherein the color image is preprocessed from a first color representation without a luminance component of a color to a second color representation that includes a luminance component.

In Example 15, the subject matter of Example 14 can optionally include wherein the first color representation is red-green-blue.

In Example 16, the subject matter of Example 15 can optionally include wherein to map colors of the color image, the controller is configured to reduce shadow effects within the color image.

In Example 17, the subject matter of Example 16 can optionally include: wherein the controller circuitry is configured to reduce shadow effects by normalizing the first color representation.

In Example 18, the subject matter of Examples 14-17 can optionally include: wherein the second color representation includes a luminance component (Y) and two color components (UV).

In Example 19, the subject matter of Example 18 can optionally include wherein to map colors of the color image, the controller is configured to discard a value of the second color representation.

In Example 20, the subject matter of Example 19 can optionally include wherein the discarded value comprises an intensity value.

In Example 21, the subject matter of any of Examples 1-20 can optionally include wherein the multi-dimensional space is two dimensions.

Example 22 can include a device for performing any of Examples 1-21.

Example 23 can include a method of performing any operations of Examples 1-21.

Example 24 can include a machine-readable medium including instructions for adaptive color transformation to aid computer vision, the instructions, when executed by controller circuitry, cause the controller circuitry to perform operations of Examples 1-21.

The above detailed description includes references to the accompanying drawings, which form a part of the detailed description. The drawings show, by way of illustration, specific embodiments that can be practiced. These embodiments are also referred to herein as “examples.” Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms “a” or “an” are used, as is common in patent documents, to include one or more than one, independent of any other instances or usages of “at least one” or “one or more.” In this document, the term “or” is used to refer to a nonexclusive or, such that “A or B”

includes “A but not B,” “B but not A,” and “A and B,” unless otherwise indicated. In the appended claims, the terms “including” and “in which” are used as the plain-English equivalents of the respective terms “comprising” and “wherein.” Also, in the following claims, the terms “including” and “comprising” are open-ended, that is, a system, device, article, or process that includes elements in addition to those listed after such a term in a claim are still deemed to fall within the scope of that claim. Moreover, in the following claims, the terms “first,” “second,” and “third,” and other numerical or ordinal terms are used merely as labels and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for adaptive color transformation to aid computer vision, the system comprising:
- a sensor interface configured to couple with one or more color image sensors; and
- controller circuitry in communication with the sensor interface to receive a color image,
  - wherein the controller circuitry includes:
  - mapping circuitry configured to map colors of the color image into a multi-dimensional space to generate a distribution of colors in the color image, a dimension of the multi-dimensional space corresponding to a color characteristic;
  - an array generator configured to generate an array of condensed representations of the distribution of colors, wherein a condensed representation is generated by rotating the distribution of colors by a color angle;
  - a comparator configured to select a high energy condensed representation of the array having an energy value greater than energy values of other condensed representations in the array, wherein the comparator is configured to compute energy values by computing a signal-to-noise ratio (SNR) for each condensed representation in the array;
  - transformation circuitry configured to generate a reduced image of an agricultural field by transforming colors in the color image based on the color angle and the high energy condensed representation; and
  - output circuitry configured to output the reduced image of the agricultural field.

2. The system of claim 1, wherein computing the SNR for each condensed representation in the array includes:
- selecting a region of interest in the color image;
- for each subsection in the region of interest, computing a Discrete Fourier Transform (DFT);
- computing a signal energy based on the DFT and a total energy based on a sum of signal energies for each scan line; and
- determining the SNR by dividing the signal energy by the total energy.

3. The system of claim 2, wherein the comparator is configured to select the condensed representation and corresponding color angle having an increased SNR relative to other SNRs.

4. The system of claim 2, wherein the controller circuitry is configured to:
- identify a plurality of color angles within a threshold of a color angle corresponding to a condensed value that provides an increased SNR relative to other SNRs;
- calculate an average of the plurality of color angles within the threshold; and
- provide the average as a selected color angle.

5. The system of claim 1, wherein the controller circuitry is configured to receive operator feedback to differentiate different portions of the color image.

6. The system of claim 1, further comprising a user input device, and wherein the controller circuitry is configured to initiate the mapping circuitry to map the colors of the color image into the multi-dimensional space upon user input using the user input from the user input device.

7. The system of claim 1, wherein the controller circuitry is configured to initiate the mapping circuitry to map the colors of the color image into the multi-dimensional space in an ongoing manner.

8. The system of claim 1, wherein the controller circuitry is configured to change the mapping of colors of the color image into the multi-dimensional space in response to a quality indicator being below a quality threshold.

9. The system of claim 1, further comprising a user display for displaying the reduced image.

10. The system of claim 9, wherein the user display is configured to further display other color images from one or more color image sensors.

11. The system of claim 1 comprising the one or more color image sensors.

12. The system of claim 1, wherein the output circuitry is configured to output the reduced image of the agricultural field to an autonomous driving controller.

13. The system of claim 1 comprising receiver circuitry and wherein the system is incorporated locally to an agricultural vehicle.

14. The system of claim 1, wherein the color image is preprocessed from a first color representation without a luminance component of a color to a second color representation that includes a luminance component.

15. The system of claim 14, wherein the first color representation is red-green-blue.

16. The system of claim 15, wherein to map colors of the color image, the controller circuitry is configured to reduce shadow effects within the color image.

17. The system of claim 16, wherein the controller circuitry is configured to reduce shadow effects by normalizing the first color representation.

18. The system of claim 14, wherein the second color representation includes a luminance component (Y) and two color components (UV).

19. The system of claim 18, wherein to map colors of the color image, the controller circuitry is configured to discard a value of the second color representation.

20. The system of claim 19, wherein the value that is discarded comprises an intensity value.

21. The system of claim 1, wherein the multi-dimensional space is two dimensions.

22. A method for adaptive color transformation to aid computer vision, the method comprising:

obtaining a color image of an agricultural field having one or more crop rows;

mapping colors of the color image into a multi-dimensional space to generate a distribution of colors, a dimension of the multi-dimensional space corresponding to a color characteristic;

generating an array of condensed representations of the distribution of colors, wherein a condensed representation of the array is generated by rotating the distribution of colors by a color angle about an axis perpendicular to the multi-dimensional space;

selecting a high energy condensed representation of the array having an energy value greater than energy values of other condensed representations in the array, wherein the energy values are computed by computing a signal-to-noise ratio (SNR) for each condensed representation in the array;

generating a reduced image of an agricultural field by transforming colors in the color image based on the color angle used to generate the high energy condensed representation; and outputting the reduced image of the agricultural field to display circuitry of an agricultural vehicle.

23. The method of claim 22, wherein the color image is preprocessed from a first color representation without a luminance component of a color to a second color representation that includes a luminance component.

24. The method of claim 23, wherein the first color representation is red-green-blue.

25. The method of claim 24, wherein mapping colors of the color image comprises reducing shadow effects within the color image.

26. The method of claim 25, wherein reducing shadow effects comprises normalizing the first color representation.

27. The method of claim 23, wherein the second color representation includes a luminance component (Y) and two color components (UV).

28. The method of claim 27, wherein mapping colors of the color image comprises discarding a value of the second color representation.

29. The method of claim 28, wherein the discarded value that is discarded comprises an intensity value.

30. The method of claim 22, wherein the multi-dimensional space is two dimensions.

31. The method of claim 22, wherein computing the SNR for each condensed representation in the array includes:

selecting a region of interest in the color image;

for each subsection in the region of interest, computing a Discrete Fourier Transform (DFT);

computing a signal energy based on the DFT and a total energy based on a sum of partial energy values computed for each scan line;

determining the SNR by dividing the signal energy by the total energy; and providing the SNR as the energy value for a respective condensed representation.

32. The method of claim 31, further comprising calculating a scan line SNR value for each scan line, and determining a color angle for each scan line based on the scan line SNR value.

33. The method of claim 31, further comprising:

selecting the condensed representation and corresponding color angle having an increased SNR relative to other SNRs.

34. The method of claim 31, further comprising:

identifying a plurality of color angles within a threshold of a corresponding color angle providing an increased SNR relative to other SNRs;

calculating an average of the plurality of color angles within the threshold; and providing the average as a selected color angle.

35. The method of claim 22, further comprising receiving operator feedback to differentiate different portions of the color image.

36. The method of claim 22, comprising initiating the mapping of colors of the color image into the multi-dimensional space upon user input.

37. The method of claim 22, comprising initiating the mapping of colors of the color image into the multi-dimensional space in an ongoing manner.

38. A non-transitory machine-readable medium including instructions for adaptive color transformation to aid computer vision, the instructions, when executed by controller circuitry, cause the controller circuitry to perform operations comprising:

obtaining a color image;

mapping colors of the color image into a multi-dimensional space to generate a distribution of colors, a dimension of the multi-dimensional space corresponding to a color characteristic;

generating an array of condensed representations of the distribution of colors, wherein a condensed representation of the array is generated by rotating the distribution of colors by a respective color angle about an axis perpendicular to the multi-dimensional space;

selecting a high energy condensed representation of the array having an energy value greater than energy values of other condensed representations in the array, and selecting a color angle associated with the high energy condensed representation, wherein the energy values are computed by computing a signal-to-noise ratio (SNR) for each condensed representation in the array;

generating a reduced image of an agricultural field by transforming colors in the color image based on the color angle selected; and outputting the reduced image of the agricultural field to display circuitry of an agricultural vehicle.

39. The non-transitory machine-readable medium of claim 38, wherein the color image is preprocessed from a first color representation without a luminance component of a color to a second color representation that includes a luminance component.

40. The non-transitory machine-readable medium of claim 39, wherein the first color representation is red-green-blue.

* * * * *